United States Patent [19]
Sterling et al.

[11] Patent Number: 5,822,588
[45] Date of Patent: Oct. 13, 1998

[54] SYSTEM AND METHOD FOR CHECKING THE USE OF SYNCHRONIZATION LOCKS IN A MULTI-THREADED TARGET PROGRAM

[75] Inventors: Nicholas A. Sterling, Sunnyvale; Steven R. Kleiman; Charles E. Fineman, both of Los Altos; Douglas E. Walls, Belmont; Keith H. Bierman, San Jose, all of Calif.

[73] Assignee: Sun Microsystem, Inc., Mountain View, Calif.

[21] Appl. No.: 489,197

[22] Filed: Jun. 9, 1995

[51] Int. Cl.$^6$ ........................................ G06F 12/06
[52] U.S. Cl. ........................................ 395/704
[58] Field of Search .................... 364/280.4, 281.5, 364/973; 395/701–709, 670, 676, 677, 704

[56] References Cited

U.S. PATENT DOCUMENTS

| | | | |
|---|---|---|---|
| 4,667,290 | 5/1987 | Goss et al. | 395/707 |
| 5,450,592 | 9/1995 | McLeod | 395/674 |
| 5,481,706 | 1/1996 | Peek | 395/726 |
| 5,524,247 | 6/1996 | Mizuno | 395/726 |
| 5,535,393 | 7/1996 | Reeve et al. | 395/706 |
| 5,590,326 | 12/1996 | Manabe | 395/674 |
| 5,632,032 | 5/1997 | Ault et al. | 395/670 |

OTHER PUBLICATIONS

"Solaris™ Multithreaded Programming Guide", SunSoft, pp. iii–158.
"Sema: a Lint–like Tool for Analyzing Semaphore Usage in a Multithreaded UNIX Kernal", Joseph A. Korty, MOD-COMP, an AEG Company, USENIX–Winter '89, pp. 113–123.
"WARLOCK–A static Data Race Analysis Tool", Nicholas Sterling, SunSoft, Inc., 1993 Winter USENIX–Jan. 25–29, 1993–San Diego, CA, pp. 97–106.
"lock_Lint User's Guide", SunSoft, pp. iii–62.

*Primary Examiner*—James P. Trammell
*Assistant Examiner*—John Q. Chavis
*Attorney, Agent, or Firm*—Erwin J. Basinski

[57] ABSTRACT

The present invention is a system and method for "checking the use of synchronization locks in a multi-threaded computer program" (hereinafter "WARLOCK II"). In Warlock II a set of source code representing a process which includes multiple threads may be annotated by the developer using a "NOTE" macro to describe the desired operation of the locks. This annotated source code is passed to a modified ANSI C compiler which outputs a special file designated a ".ll" file, as for example, file "foo.ll". This special ".ll" file is then processed as input along with other designated ".ll" files which might be related, by a "wlanalyze" program which will check the source code of the target programs in the ".ll" files to determine whether their use of synchronization locks is consistent with the intended use as specified in the annotations.

36 Claims, 12 Drawing Sheets

TIGHTLY-COUPLED MULTIPROCESSOR SYSTEM

FIG. 6A

```
*****************************************
* THE INFORMATION STORED IN example.11 *    ─── 602
*****************************************

⎫
version = 7                                         ⎪
product name = lock_lint                            ⎪
608 ─── lock  :mtx protects variable :count         ⎪
            610 ⏋               612     614         ⎪
616 ─── function :func1 () is                       ⎪
     {                                              ⎪
     618 ─── acquire mutex lock :mtx                ⎪
     620 ─── read from variable :count              ⎪
     622 ─── conditional branch to label 1          ⎬ ─── 604
     624 ─── write to variable :count               ⎪
     626 ─── unconditional branch to label 2        ⎪
     1:                                             ⎪
        call function :func2 ()                     ⎪
        release mutex lock :mtx                     ⎪
        call function :func2 ()                     ⎪
        read from variable :count                   ⎪
        write to variable :count                    ⎪
     2:                                             ⎪
     function :func2 () is                          ⎪
     {                                              ⎪
     3:                                             ⎪
        assert (mutex :mtx held)                    ⎪
628 ─── }                                           ⎭
```

| FIG. 6A |
|---------|
| FIG. 6B |

FIG. 6

```
                   *********************
                   * THE RECORDS IN example.ll *  ~ 606
                   *********************

Version        07 00
         Product Name   6c 6f 63 6b 5f 6c 69 6e 74 00 00 00 00 00 00 00    lock_lint......
                    10  00 00 00 00 00 00 00 00 00 00 00 00 00 00 00 00    ................
                    20  00
630 — Mutex Name       00 00 00 00 01 3a 6d 74 78 00                      .....:mtx.
632 — Var Name         00 00 00 02 3a 63 6f 75 6e 74 00                   ....:count.
634 — Protect          00 00 00 01 00 00 00 02
    ⎧ Func Name        00 00 00 03 3a 66 75 6e 63 31 00                   ....:func1.
636 ⎨ File Name        00 00 00 04 65 78 61 6d 70 6c 65 2e 63 00          ....example.c.
    ⎩ FuncDefn         00 00 00 03 00 00 00 04 00 00 00 18                ............
638 — Acq Mtx          00 00 00 01 00 00 00 04 00 00 00 19                ............
640 — Read             00 00 00 02 00 00 00 04 00 00 00 1a                ............
642 — CBranch          00 00 00 69
644 — Write            00 00 00 02 00 00 00 04 00 00 00 1b                ............
646 — Branch           00 00 00 68
         Label         00 00 00 69
         Func Name     00 00 00 05 3a 66 75 6e 63 32 00                   ....:func2.
         Call          00 00 00 05 00 00 00 1e                            ........
         Rel Mtx       00 00 00 01 00 00 00 1f                            ........
         Call          00 00 00 05 00 00 00 21                            ........
         Read          00 00 00 02 00 00 00 22                            ........
         Write         00 00 00 02 00 00 00 22                            ........
         Label         00 00 00 68
628 — Return
         Func Defn     00 00 00 05 00 00 00 25                            ........
         Mutex Held!   00 00 00 01 00 00 00 26                            ........%&
         Label         00 00 00 6b                                        ...k
         Return
```

FIG. 6B

```
************************************************
*        WHAT YOU GET WHEN YOU RUN WARLOCK      *
************************************************
```

\* Some paths through function have wrong side effects!
   function = :func1 [example.c, 24]
   side effects declared by annotationa/commands:
      none
   side effects found in one or more paths through function:
      none
   side effects found in one or more paths through function:
      acquire mutex : mtx
   Paths with wrong side effects will not be analyzed.

\* Lock not write-held as asserted!
   lock = :mtx (mutex)
   some prior activity on this lock:
     acquire mutex
       : func1 (example.c, 25)
     release mutex
       : func1 (example.c, 31)
   tracebck now:
       : func2 (example.c, 38)
       : func1 (example.c, 33)

\* Lock not protecting variable as asserted during read!
   variable  = : count
   protector = : mtx (mutex)
   locks held =
     where   = : func1 (example.c, 34)

\* Lock not protecting variable as asserted during write!
   variable  = : count
   protector = : mtx (mutex)
   locks held =
     where   = : func1 (example.c, 34)

The following variables don't seem to be protected consistently:
     : count

FIG. 8

```
# Template make rules for warlock II.  You have to replace the following:
#     ObjsVariable       a make variable containing the names of
#                        the .o files coming from .c files
#     SourceDirectory    the directory containing the .c files
#     CommandFile        t he .wlcmd file of warlock commands

# Create list of .ll files from list of .0 files from C source.
WARLOCK_FILES = $(ObjsVariable: %.o=%.ll)

# Target to create the .ll files.
warlock_files: $(WARLOCK_FILES)

# Make a .ll file from a .c file.
%.ll: SourceDirectory/%.c
     wlcc $(CFLAGS) $(CPPFLAGS) -o $@ $<

# Run warlock on all .ll files together; you may want to do smaller groups.
warlock: warlock_files CommandFile.wlcmd
     warlock -c CommandFile.wlcmd $(WARLOCK_FILES)

# Rule for getting a .wlcmd file from SCCS.
%.wlcmd:
     [ -f$@ ] || sccs get $@
```

SYSTEM AND METHOD FOR CHECKING THE USE OF SYNCHRONIZATION LOCKS IN A MULTI-THREADED TARGET PROGRAM

BACKGROUND OF THE INVENTION

1. Field of the Invention

This invention relates to the field of multi-processing computers, and multi-threaded computer systems development and debugging. More specifically, the invention is a method and apparatus for a static analysis tool which can help find locking problems in a target multi-threaded program.

2. Background

The development of computer systems has progressed from traditional uni-processor systems to the use of systems with multiple central processor units (CPUs) in a given computer system. Such systems are designated "Multi-processor" hardware systems. Programming systems, including operating systems, have been designed to make use of multiple CPUs in a system by permitting application programs to be developed which use multiple threads which may be executed concurrently on the several CPUs. This requires additional control mechanisms to synchronize the different parts of an application which might be running simultaneously on two or more CPUs. Such new programming capabilities are generally embodied in the new programming paradigm called "multi-threading." A "thread of control" or more simply a "thread" is a sequence of instructions being executed in a program. A thread has a program counter (PC) and a stack to keep track of local variables and return addresses. Threads execute independently. Threads share the process instructions and most of the data, as well as share most of the operating system state of a process. Each thread may make arbitrary system calls. Threads and the associated control and services of a multithreaded system (including synchronization services) may be implemented as objects. Synchronization techniques which are implemented as objects include mutual exclusion (mutex) locks, semaphores, condition variables, and readers/writer locks. For more information on multithreads as applied to application programs, see the paper titled "SunOS Multi-thread Architecture" by M. L. Powell, S. R. Kleiman, S. Barton, D. Shah, D. Stein, M. Weeks, Proceedings of the USENIX Conference—Winter '91—Dallas, Tex., pages 65–79. See also the text titled "Solaris MT Programming Guide", SunSoft Press 1994 ISBN 0-13-160896-7.

It is desirable that developers of multi-threaded programs have a tool to assist them in verifying that their use of locks in multi-threaded code is correct.

For example, in multi-threaded code, developers design threads to prevent them from corrupting data by serializing the thread's access to this data through the use of locks. It is crucial that a thread hold the proper lock whenever accessing a data variable, and unfortunately it is very hard to tell when this is not being done. The problem generally manifests itself as highly intermittent instances of data corruption, often with the details differing each time.

Even if the program thread does hold the proper locks at all times, there can still be problems. It may be that when several threads are in just the right places in the code at the same time, the program "deadlocks", that is, hangs indefinitely with each thread waiting for a lock held by another thread. Or a particular thread might inadvertently go into a long-term wait while still holding some lock, causing other threads to be delayed unnecessarily.

In the past, attempts have been made to provide tools to assist developers with such analysis. Early papers described static analysis of source code by the use of concurrency graphs and other flow-graphing techniques but these suffer from excessive processing time in creating the graphs and from requiring an inordinate amount of memory to store the graphs when testing large target programs. Moreover these early systems were not capable of finding all data races. A different approach to this problem was described in the paper "WARLOCK—A Static Data Race Analysis Tool", by Nicholas Sterling (the inventor of the method and apparatus disclosed herein), pages 97–106, 1993 Winter USENIX—Jan. 25–29, 1993—San Diego, Calif., which is incorporated fully herein by reference. This paper described a proposed system of using a modified compiler to process "annotations" in the form of "comments" wherein the annotations could indicate some information about how locks were used in a target program, and a back-end program to analyze the target program for proper use of locks. This Warlock system used a technique of simulating the execution of all possible paths through a multi-threaded program, watching what the program does with locks, and reporting what it thinks might be problems. An attempt was made to reduce this proposed Warlock system to practice in a manner that would be suitable for sale. Unfortunately, this attempt determined that it was undesirable to use "comments" lines in the source code for purposes other than for "commenting in a way that has no particular meaning to a compiler". The use of the "comments" field as a way of "annotating" the source code in a manner meaningful enough for a modified ANSI C compiler to possible recognize a need to perform a particular function was deemed generally contrary to the industry expectations related to the meaning of "comments" in a program source code. Nevertheless a modified version of this Warlock system, without using the annotations in the "comments" field, was incorporated into a product called "LockLint" by Sun Microsystems, Inc. and released in September 1994 as part of its SPARCworks™/IMPact™ multi-threaded development tools package.

This product LockLint required the developer to prepare a separate command file in order to provide some data on how the various locks were supposed to be used. However LockLint has not proven to be effective for users because of this separate command file and the lack of a method for the developers to provide, in the source code, information in the form of annotations to define the locks used and their characteristics. Since, in LockLint, these commands are in a separate file from the source code, commands quickly get out of date. Similarly, since these commands are separate from the source code, the command syntax must include additional identifiers to make reference to variables specific. This added complexity is unnecessary if annotations are embedded in the source code. Additionally, LockLint had an inability to make assertions about lock state at any point within a function. The product LockLint is described in detail in the "lock_lint User's Guide", Part # 801-6692-10 issued September 1994 by SunSoft, a Sun Microsystems, Inc. company, which is incorporated fully herein by reference.

The present invention, which is an improvement of the above described Warlock system, and which is designated hereinafter as "Warlock II", solves this problem of providing an acceptable mechanism with which the developer can provide some "annotations" to a lock-checking tool and provides the capability in its "wlanalyze" portion to use the annotations for checking the various uses of locks in a way which was not previously possible.

SUMMARY OF THE INVENTION

The present invention overcomes the disadvantages of the above described systems by providing an efficient, adaptable system and method for checking the use of synchronization locks in a multi-threaded program. The present invention, designated herein as Warlock II, is an improvement of the previous Warlock system wherein a NOTE macro is used by a developer to provide annotations to inform the analyzer of the intended purposes for locks specified and wherein an improved compiler front-end can process this information and the analysis system can make use of this information to analyze the target application program.

In one aspect of the invention, a method for locating errors in the use of synchronization locks in a multi-threaded target program is disclosed, which, through the use of a computer having a central processor unit, a memory, an input and an output device and a display device, provides a modified ANSI C compiler which is configured to process NOTE annotated source code for the target program and to produce an intermediate output file containing coded representations of the source code and coded representations of annotations; and which provides an analyzer program configured to receive the intermediate output file and to analyze uses of synchronization locks by the source code and to compare these uses of synchronization locks with lock uses specified in the annotations; and to display at least a subset of inconsistencies in this usage of synchronization locks as detected by said analyzer program.

In another aspect of the invention a modified ANSI C compiler is disclosed for locating errors in the use of synchronization locks in a multi-threaded target program, through the use of a computer having a central processor unit, a memory, an input and an output device and a display device, the compiler having a modified syntactic and semantic analysis module configured to process NOTE annotated source code for the target program and to create annotations which are coded as extensions to C language code; having a collection module configured to summarize the annotations, the summary being for use in analyzing lock usage by the target program; and having an output mechanism configured to produce an intermediate output file containing coded representations of the source code and coded representations of said annotations.

In yet another aspect of the invention, an analyzer system is disclosed for locating errors in the use of synchronization locks in a multi-threaded target program, through the use of a computer, the analyzer system having a first analysis mechanism configured to process a file containing coded representations of source code and coded representations of annotations for the target program and to produce at least a set of data structures configured to contain representations of annotated source code. It is further disclosed that these data structures include

- a table of functions which contains for each of the functions at least a list of basic blocks for each function and a list of side effects for locks used by each function;
- a table of locks which contains for each lock at least a lock type, a current lock state, and a history of activity on each lock:
- a table of variables which contains for each variable at least a list of locks consistently held every time each variable was accessed and an identification of a lock declared by annotation to protect each variable, if the identification has been specified;
- a table of function pointers which contains for each pointer at least a list of functions which can be reached by a call through the pointer; and an adjacency matrix configured to record orderings between locks during a simulation of an execution of the target program and where a transitive closure can be performed on these orderings between locks to provide an indication of any deadlocks which may occur in the target program.

In yet another aspect of the invention, a computer program product is disclosed which includes a computer usable medium having computer readable program code mechanisms embodied therein configured to locate errors in the use of synchronization locks in a multi-threaded target program, which in turn include computer readable code mechanisms configured to cause a computer to process annotated source code for the target program and to produce an intermediate output file containing coded representations of the source code and coded representations of annotations; computer readable code mechanisms configured to cause the computer to process the intermediate output file and to analyze uses of synchronization locks by the source code in the intermediate output file and to compare these uses of synchronization locks with lock uses specified in the annotations; and to display at least a subset of inconsistencies in this usage of the synchronization locks as detected by this analysis.

DESCRIPTION OF THE DRAWINGS

The objects, features and advantages of the system of the present invention will be apparent from the following description in which:

FIG. 6 illustrates a typical .ll file.

FIG. 8 illustrates a typical output report from "wlanalyze".

FIG. 10 illustrates a typical "make" script allowing the use of Warlock II to be automated.

NOTATIONS AND NOMENCLATURE

Figure 1:
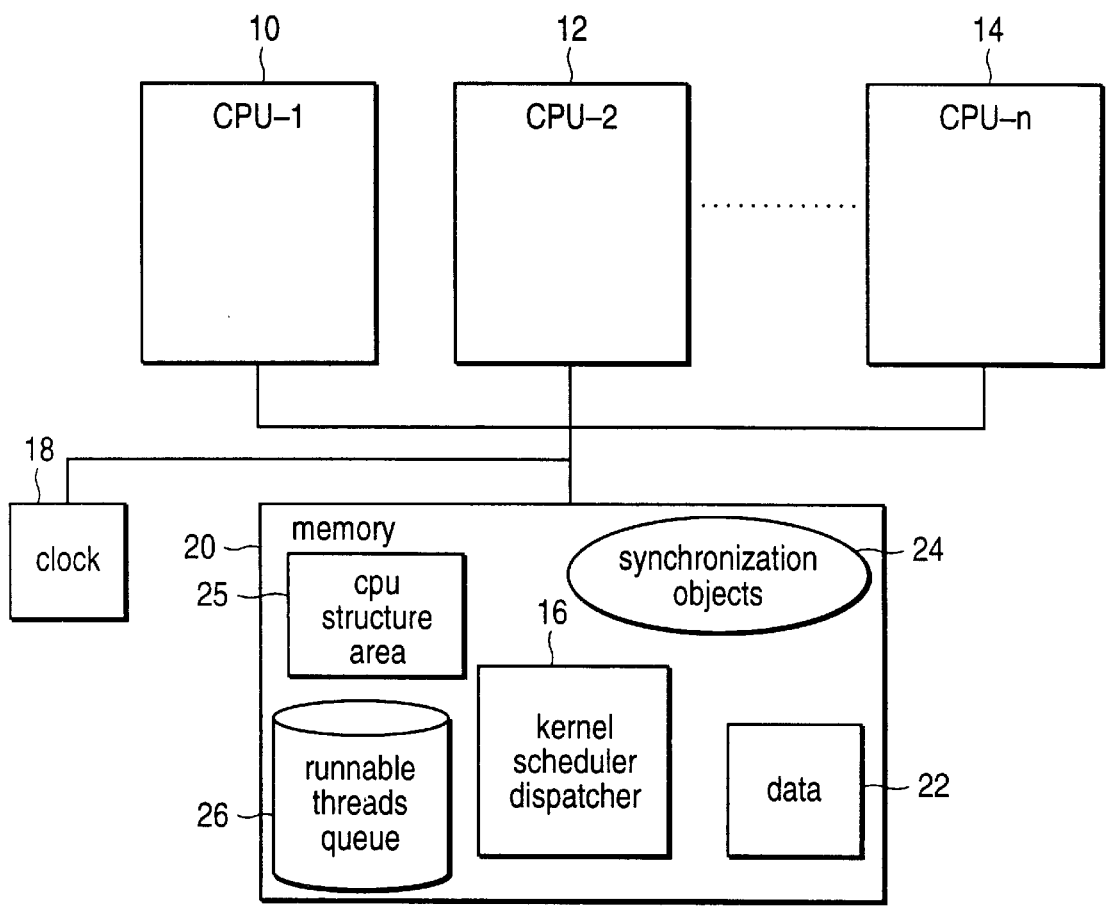
FIG. 1 illustrates a typical multi-processor hardware system.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be bourne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Apparatus and methods for static checking of a target multi-threaded program to determine whether synchronization locks have been properly used are disclosed. In the following description, for purposes of explanation, specific instruction calls, modules, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily. Similarly, in the preferred embodiment, use is made of uni-processor and multi-processor computer systems as well as the Solaris operating system, SPARCompiler ANSI C, all of which are made and sold by Sun Microsystems, Inc. However the present invention may be practiced on other computer hardware systems and using other compatible operating systems and C compilers as well.

The present invention is a system and method for "checking the use of synchronization locks in a multi-threaded computer program" (hereinafter "WARLOCK II"). The invention is described in more detail below. As a preliminary, however, the computer hardware environment of the present invention will now be described. It will be appreciated that the present invention may be easily adapted to function on any number of vendor's multi-processor systems such as IBM, Hewlett Packard, DEC, MIPS, etc. and to function with target application programs to be debugged from various software vendors such as IBM, Hewlett Packard, DEC, MIPS, Microsoft, Novell, etc.

The Multi-processing Environment.

FIG. 1 depicts a representative multi-processor machine configuration which would be typical for use with a multi-threaded target program. It should be noted however that multi-threaded programs can run on single-processor systems as well as multi-processor systems but they just do not run as efficiently on a single-processor system. The present invention, Warlock II, consists of programs which themselves are not multi-threaded. In the preferred embodiment, Warlock II is configured to analyze target programs which are intended to run on SunOS 5.3, which is the operating system part of the Sun Solaris Operating Environment. SunOS 5.3 is intended to run on tightly-coupled shared memory multi-processor systems with one or more processors. Referring now to FIG. 1, the typical multi-processor computer system is assumed to have one or more central processor units (CPUs) 10, 12, 14 sharing a memory 20 and clock 18. The operating system kernel 16 assumes all processors are equivalent. Processors 10, 12, 14 execute kernel threads selected from the queue of runnable kernel threads 26. If a particular multiprocessor implementation places an asymmetric load on the processors (e.g., interrupts) the kernel 16 will nonetheless schedule threads to processors 10, 12, 14 as if they were equivalent. In general, all processors 10, 12, 14 see the same data in memory 20. This model is relaxed, somewhat, in that memory operations issued by a processor 10, 12, 14 may be delayed or reordered when viewed by other processors. In this environment, shared access to memory is preferably protected by synchronization objects 24. (The data locking mechanisms are also sometimes called synchronization variables or synchronization primitives). The exception is that single, primitive data items may be read or updated atomically (e.g. all the bytes in a word change at the same time). (A "word" is a four-byte piece of data.) The shared memory 20 is assumed to be symmetrical. Thus the kernel 16 currently does not ensure that processes scheduled on a particular processor 10 (for example), are placed in a particular piece of memory 20 that is faster to access from that processor 10. It is possible for a kernel 16 to run "symmetrically" on a multiprocessor yet not allow more than one processor 10, 12, 14 to execute kernel code 16. This is clearly not a strategy that scales well with increasing numbers of processors, and in the preferred embodiment of the present invention, all of the processors 10, 12, 14 in the system can execute the shared kernel code 16 simultaneously, and use the data structures in the shared memory 20 to communicate between the processors 10, 12, 14 as required. Accordingly, when a target program process may have multiple threads concurrently accessing the same memory location it is essential for the developer to know that he/she correctly uses synchronization locks to protect the integrity of the memory location in question.

Continuing with FIG. 1, the "cpu structure area" 25 contains a data structure for each processor 10, 12, 14. These per-processor structures contain per-processor data, such as: currently executing thread, idle thread, current dispatching priority, and interrupt handling information.

SunOS 5.0 is designed with a relatively "fine grained" locking strategy to take advantage of as many processors 10, 12, 14 as possible. Each kernel subsystem has a locking strategy designed to allow a high degree of concurrency for frequent operations. In general, access to data items 22 are protected by locks as opposed to locking access to entire routines. Infrequent operations are usually coarsely locked with simple mutual exclusion. Overall, SunOS 5.0 has several hundred distinct synchronization objects 24 statically, and can have many thousands of synchronization objects 24 dynamically. Threads synchronize via a variety of synchronization objects or primitives, such as:

Mutual exclusion (mutex) locks,

Condition variables,

Counting semaphores,

Multiple readers, single writer (readers/writer) locks.

In the kernel of SunOS 5.0 the mutex and writer locks support a dispatching priority inheritance protocol which prevents lower priority threads from blocking higher priority threads (priority inversions).

Figure 2:
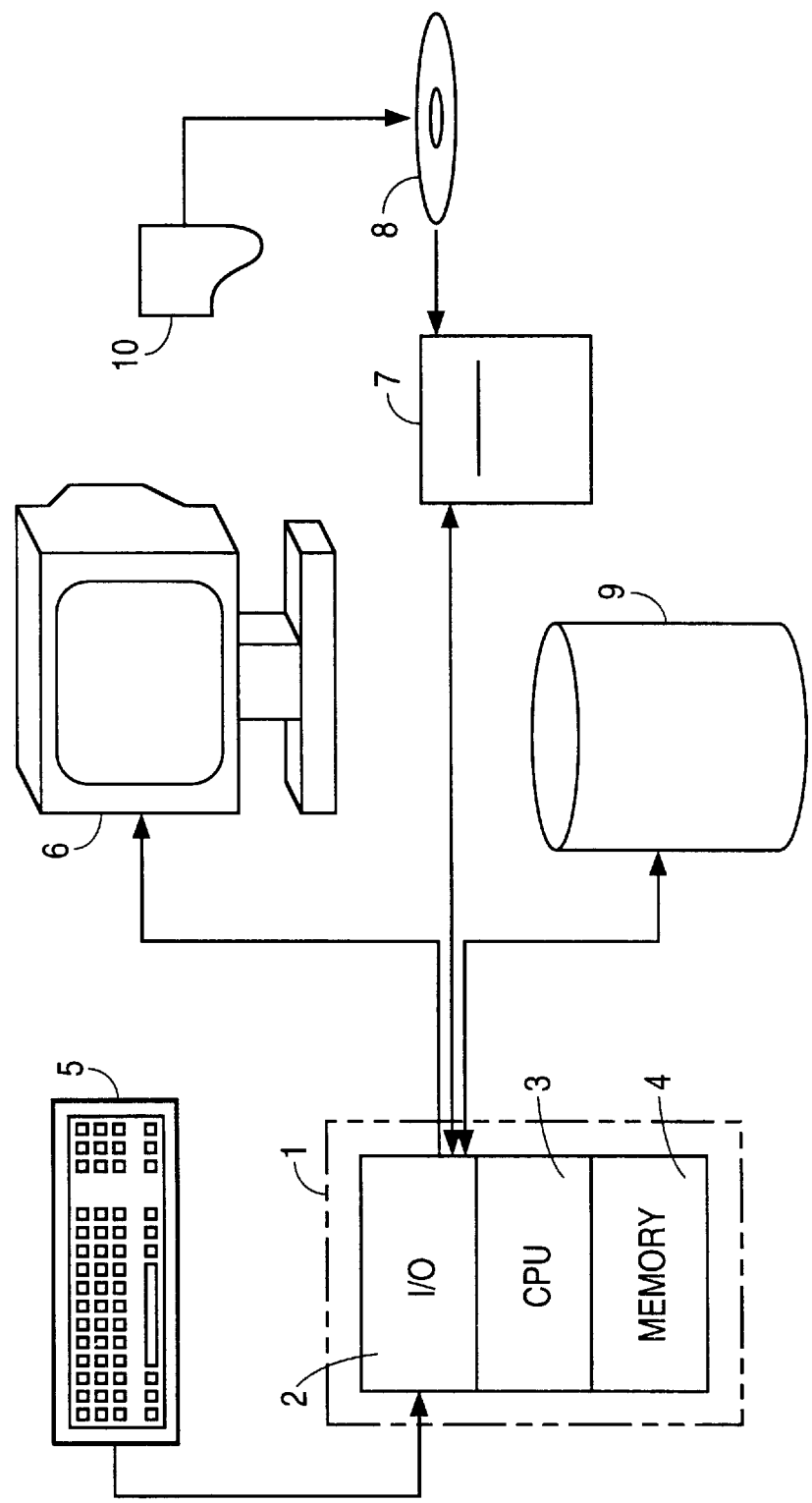
FIG. 2 illustrates a typical computer system used in practicing the present invention.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 2, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data.

What is the Warlock II system

Warlock II is a tool designed to help detect problems related to the incorrect use of synchronization locks in multi-threaded programs. It comprises a modified ANSI C compiler and a modified "wlanalyze" module (which in the preferred embodiment run on the Sun Microsystems, Inc. Solaris 2.x operating environment.). A developer must modify the source code of the target program with special NOTE annotations that lets Warlock II know the developer's intent with respect to the locks used. The modified ANSI C compiler portion generates an output file (called an ".ll" file) from this NOTE annotated version of the target program source code. The modified wlanalyze module processes this ".ll" file and simulates the execution of all possible paths through the target program, watching what the target program does with locks, and reporting what it thinks might be problems.

Warlock II reports many different types of problems, such as failure to release a lock before returning from a function failure to acquire a lock before accessing data accessible by multiple threads releasing a lock which is not held using the wrong lock deadlock improper use of locks with condition variables holding a lock when all locks should be released.

However, in the presently preferred embodiment, Warlock II does not catch all locking problems. For example, it is possible to create data races which will not be caught by Warlock II. Also, Warlock II is a static analysis tool, which means that it looks at the control flow of a target program without knowing what values the variables might have. This can cause inaccuracies in Warlock II's reporting. Nevertheless, using this preferred embodiment developers have found many problems using Warlock II.

In the preferred embodiment, Warlock II analyzes only the use of mutexes and readers/writer locks. If a variable is protected by a semaphore or some other scheme, Warlock II must be told to ignore the variable. Those skilled in the art will recognize that alternative embodiments which might require more complicated analysis may be developed to also verify some uses of semaphores or other locking primitives.

Figure 3:
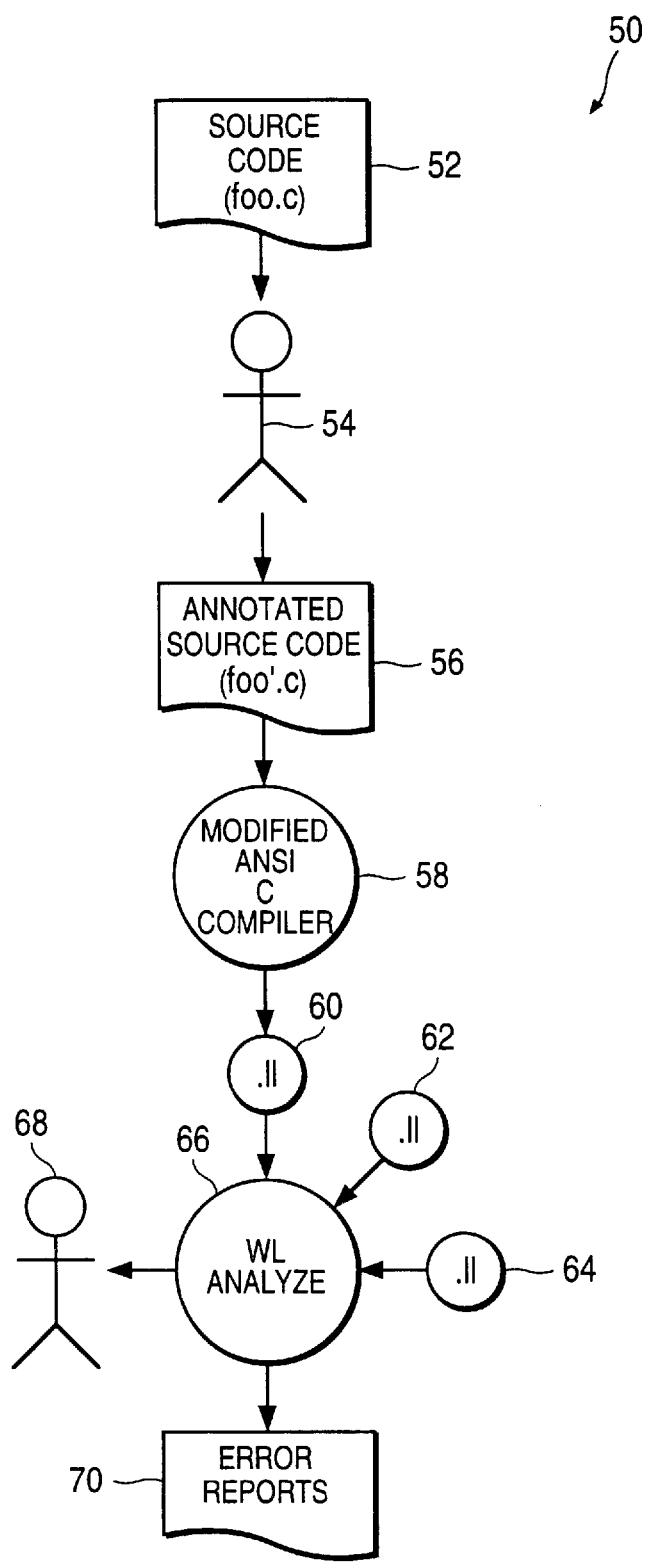
FIG. 3 illustrates a block diagram of the basic components of the present invention.

The invention is now described generally with reference to the Warlock II flow chart 50 shown in FIG. 3. To use the Warlock II system of the preferred embodiment, the source code 52 of the developer's target program is modified by the developer 54 to include annotations using the "NOTE" macro to define the locks used and to describe the intended purpose of the defined locks, thereby producing a set of annotated source code 56. This annotated source code 56 is processed by a modified ANSI C compiler 58 referred to as "wlcc". The modified compiler 58 produces an ".ll" file 60 corresponding to the annotated source code 56 which is then used, along with any related ".ll" files 62, 64 as input to the "wlanalyze" program 66. The user/developer 68 interacts with the "wlanalyze" program 66 to process the inputted files 60, 62, 64 and an error report 70 is produced describing the lock problems detected. The user/developer 68 would typically correct his source code 56 to fix the identified problems and run the process again beginning at inputting the revised source code into the modified compiler 58 once again.

Some additional capabilities of the present invention include the following:

It watches initializations of and assignments to function pointers to find out which functions might be called when a call is made through a function pointer.

It keeps track of locks and functions passed to functions as arguments, so that when the argument is locked or called, the appropriate lock or function is used. The same technique could be extended to support ordinary data passed as arguments.

Because of function pointers, it can appear that calling sequences are possible which really are not possible, and often those invalid calling sequences result in errors. It is possible to specify that particular calling sequences are invalid, as in disallow func1 func2 func3

This command tells wlanalyze that if it finds itself calling func3 from func2, when func2 was called from func1, it should ignore the call to func3.

In the preferred embodiment, Warlock II works with ANSI C source. Those skilled in the art will recognize that this process could be used with any compiler that supports multi-threaded programming, such as C++, Ada, Fortran, Lisp, Modula, etc.

How to Make and Use it

The modified C compiler front end.

Figure 4A:
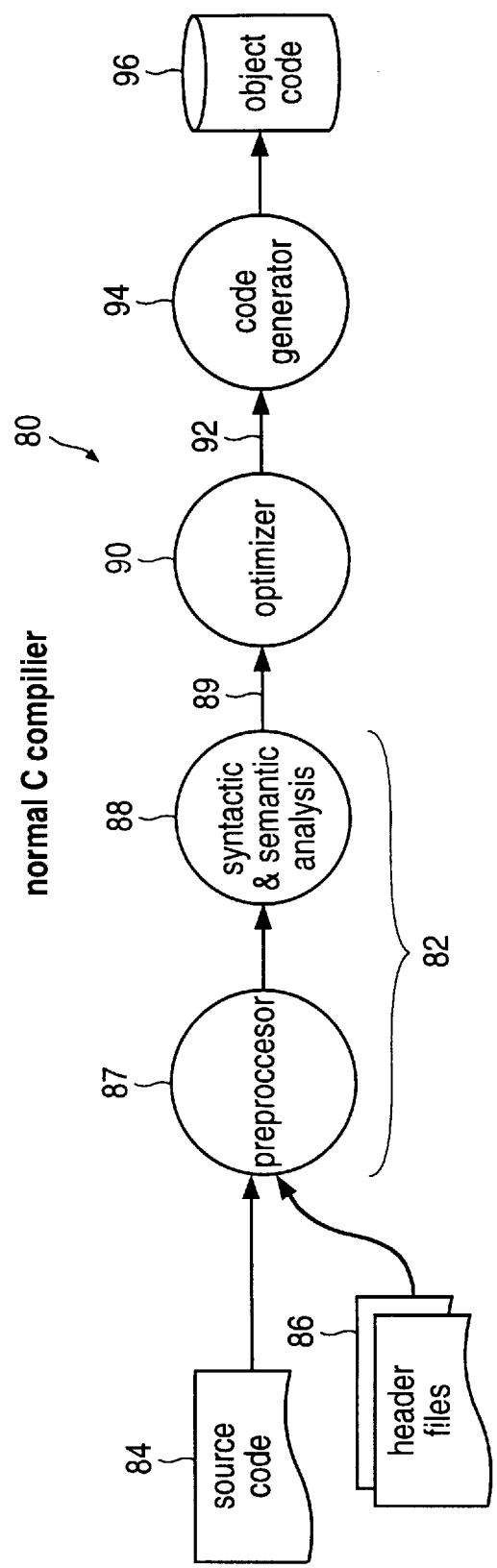
FIG. 4a illustrates a normal C compiler configuration.

One element of the Warlock II system is a modified C compiler. A typical C compiler 80 is shown in FIG. 4a. The compiler 80 comprises a front end 82 which is made up of a preprocessor 87 and syntactic and semantic analysis modules 88, an optimizer module 90 and a code generation module 94. The front end 82 produces intermediate code 89 from the source code 84 and header files 86 that is input to the front end preprocessor 87. This intermediate code 89 is passed to a code optimizer module 90 which performs various optimizing operations on the code and thereafter outputs a second intermediate code file 92 to the code generator module 94 which in turn outputs a ".o" file 96 containing executable binary code.

Figure 4B:
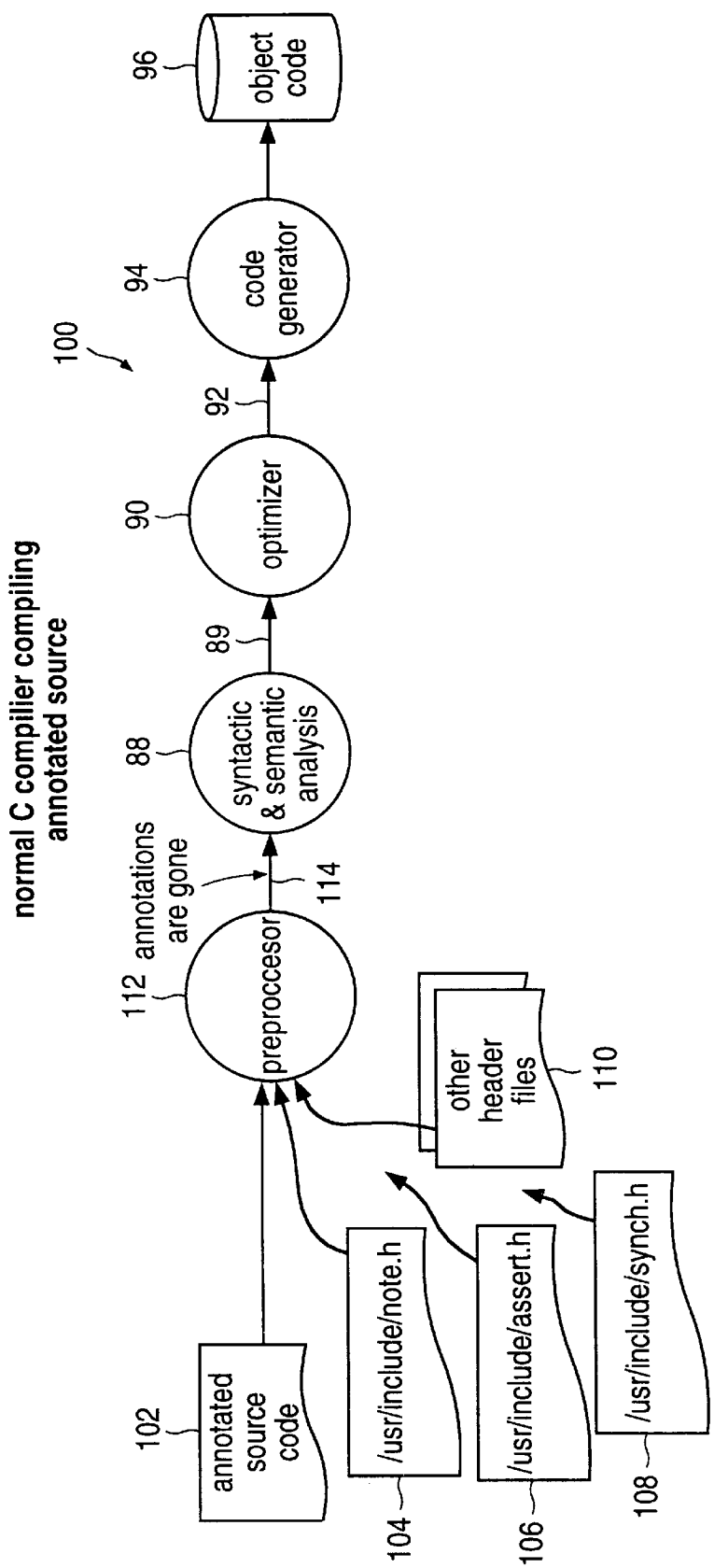
FIG. 4b illustrates a normal C compiler processing annotated source code.

Referring to FIG. 4b, a normal C compiler 100 is shown, wherein the source code being processed by a normal front end of a C compiler contains "annotated source code" 102. In FIG. 4b the header files (86 in FIG. 4a) have been replaced by specific header files of the type "/usr/include/note.h" 104, "/usr/include/assert.h" 106 and "/usr/include/synch.h" 108 and other standard header files 110. When all of these header files are processed by a normal C compiler preprocessor 112 the output 114 from the preprocessor no longer has any reference to any of the annotations contained in the annotated source code 102. All other elements of the compiler are the same. It is clear that a modified preprocessor and header files are required if the NOTE annotations in the source code are to be treated as representative of some information. Accordingly, in the preferred embodiment of the present invention a modified front end of the C compiler is used. This modified front end includes a new and innovative mechanism allowing the preprocessor to retain the NOTE annotations data in the data stream passed to the syntactic and semantic analysis module, which is capable of processing the C language and extensions related to annotations. In the preferred embodiment, this revised front end is created by the use of the well known "yacc" program. "yacc" stands for "yet another compiler-compiler" and is available as a command on the UNIX system. yacc is a LALR parser generator which can translate an input file (containing a yacc specification for the translator) into a C program which will parse/translate an incoming file using the LALR method. Appendix A contains the extensions to the code for the yacc specification used in the preferred embodiment to generate the revised compiler front end. (For more information on yacc, LALR and compilers in general, the reader is referred to any of a number of texts on compilers such as for example, "Compilers: Principles, Techniques and Tools" by Alfred V. Aho, Ravi Sethi and Jeffrey D. Ullman, Addison-Wesley Publishing Co. 1986, ISBN 0-201-10088-6). Appendix B contains an additional example of NOTE annotated source code for a target program showing the header files and a sample NOTE.

Figure 5:
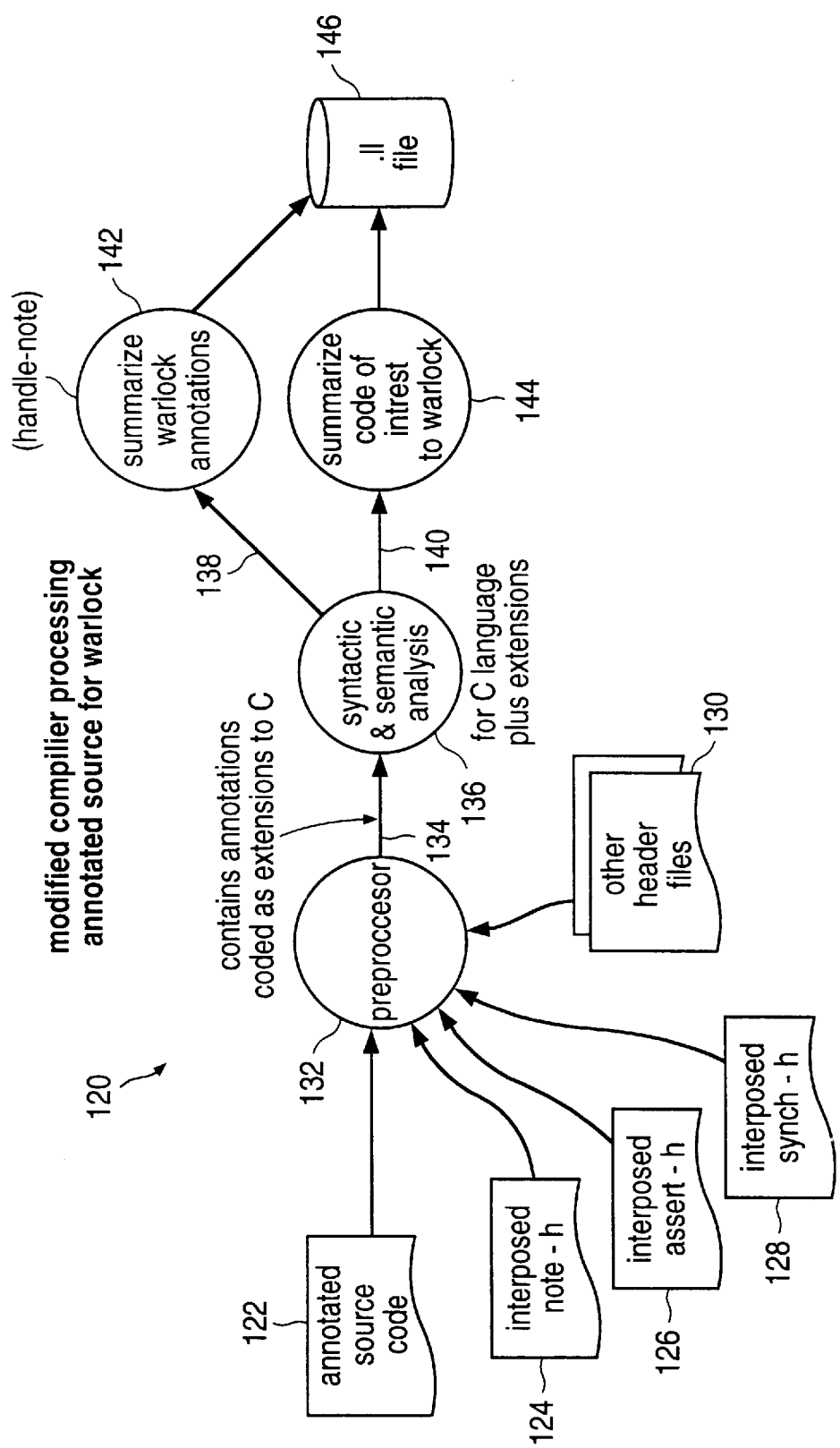
FIG. 5 illustrates a modified C compiler front end to produce a .ll file output.

Referring now to FIG. 5, a modified compiler processing NOTE annotated source code for Warlock II 120 is depicted. In FIG. 5, a NOTE annotated source file 122, interposed note.h file 124, interposed assert.h file 126, interposed synch.h file 128 and other header files 130 are fed to the revised preprocessor 132. How this preprocessor 132 handles these header files is explained below. The modified preprocessor 132 has been augmented to, upon being invoked by a "wlcc" command, accept a source code file containing NOTE annotations 122 and to output, instead of a normal intermediate code file (114 in FIG. 4b) but rather a file containing annotations coded as extensions to C 134 which file is input to the new syntactic and semantic analysis module 136 which knows how to process the C language plus extensions. This analysis module 136 creates two outputs, one containing information from the NOTE annotations 138 which is passed to a "handle-note" module 142 which summarizes the Warlock II annotations. The analysis module 136 also outputs a file of normal C code 140 which is passed to a routine 144 that summarizes the code of interest to Warlock II. Both the "handle-note" routine 142 and the "summarize-C-code" routine output data which is combined into a ".ll" file 146 which contains specially formatted semantics of the source code 122 as well as information from the NOTE macro which gives further information about the use of locks in the target MT program. The format of this file is described in more detail with respect to the exemplary code section shown in FIG. 6. The types of "NOTE" and "assert" annotations which are handled by the preferred embodiment are shown in Appendix C attached hereto. Those skilled in the art will recognize that any number of other NOTE or assert types can be devised to define other types of locking situations and the present invention is not to be considered limited by the number handled by the preferred embodiment.

Header File Interposition

As indicated above, the preprocessor 132 is designed to handle the interposed header files 124, 126, 128 in a special way. Recall that all uses of the NOTE macro must disappear when compiling normally, but must be converted to special extensions to normal C syntax when compiling for Warlock II. This is accomplished by interposing header files when compiling for Warlock II. The same technique is used to prevent uses of the "assert" macro from being expanded as they normally would.

The compiler's preprocessor maintains a list of directories which should be searched whenever a header file is "included" by the code being compiled. Typically under the Unix operating system the directory "/usr/include" is last in this list, and the user can add other directories before that one.

In the preferred implementation, co-located with "wlcc" is a directory containing special versions of key header files such as "assert.h" and "note.h." Wlcc interposes this directory into the list of directories to be searched, before "/usr/include" ; this means, for example, that when the code include <assert.h> is encountered, the preprocessor includes wlcc's special version of assert.h. That special version contains the following code:

```
#pragma reinclude
#undef assert
#define assert(x)    __ll__assert(x)
extern int __ll__assert( );
```

The first line, "#pragma reinclude", invokes an extension to the compiler created for the Warlock II system. This pragma tells the preprocessor to include the "real" version of this same file, that is, the file in front of which this one was interposed. This is accomplished by remembering in which directory we find each "included" header file; then if a "#pragma reinclude" is encountered, the search begins again with the directory in the list of include directories following the one in which the file was originally found.

After the "real" assert.h is included, the interposed version then undefines the "assert" macro and redefines it to invoke external function __ll__assert. This name can then be recognized in the parse tree.

Without the "#pragma reinclude" capability, the interposed version of "assert.h" would have to provide all of the other definitions provided by the real "assert.h" , whereas the only thing the interposed version really wants to alter is the definition of the "assert" macro. Because of "#pragma reinclude", it is not necessary to release a new version of the "interposed assert.h" every time a modification is made to the real "assert.h" (which could be difficult with a tool such as the Warlock II system since it is not bundled with the operating system).

Thus header file interposition provides the ability to alter the interpretation of system macros, and "#pragma reinclude" makes it possible to interpose without creating a maintenance burden.

NOTE handling Module (142 in FIG. 5)

The ".ll" file (146 in FIG. 5), which contains doctored macro definitions excerpted from the "interposed note.h"

header 124, shows how NOTEs are expanded into the form recognized by the grammar as modified for Warlock II. In the preferred embodiment implementation the grammar expects "_annotation" as the token introducing a NOTE, an easy implementation with the available C compiler. The name of the note gets "_NOTE_" prepended to avoid possible conflicts (it isn't likely, but theoretically the user could use a name like ASSUMING_PROTECTED for something else). The following preprocessor macro definitions illustrate the process for the MUTEX_PROTECTS_DATA annotation:

```
#define NOTE(note) _annotation(_NOTE_## note)
#define _ANNOTATION1(name,str1) #name,#str1
#define _ANNOTATION2(name,str1,str2) #name,(#str1,#str2)
#define _NOTE_MUTEX_PROTECTS_DATA(mutex, data)
    _ANNOTATION2(MUTEX_PROTECTS_DATA, mutex, data)
#define _NOTE_ASSUMING_PROTECTED "ASSUMING_PROTECTED",
For example, NOTE(MUTEX_PROTECTS_DATA(m, a b))
becomes_annotation(_NOTE_MUTEX_PROTECTS_DATA(m, a b))
becomes_annotation(_ANNOTATION2 (MUTEX_PROTECTS_DATA, m, a b))
becomes_annotation("MUTEX_PROTECTS_DATA", ("m", "a b"))
where NOTE(ASSUMING_PROTECTED(*p, *q))
becomes_annotation(_NOTE_ASSUMING_PROTECTED(*p, *q))
becomes_annotation("ASSUMING_PROTECTED", (*p, *q))
An unrecognized annotation is handled as follows:
    NOTE(BAD_NAME(args))
becomes_annotation(_NOTE_BAD_NAME(args))
```

The parser notices that within an "_annotation ( )" the first argument is not a string. That means the annotation wasn't translated to the proper form by any macro, because there is no macro for that name. Therefore the name is either invalid or is undefined for this tool (a dictionary of NOTE annotations for all installed tools may be maintained, which can then be consulted by the parser to determine whether the name is valid).

Why These NOTE Annotations Improve the Prior Art LockLint System.

The prior art LockLint system made no use of annotations per se but rather used a separate set of commands in a separate command file in an attempt to analyze lock problems. The following describes the advantages of the use of annotations in the code over putting commands in a command file:

Since they are in a separate file from the source code, commands quickly get out of date. NOTE annotations, being mixed in with the code that they describe, will generally be better maintained.

Consider an annotation like

NOTE(MUTEX_PROTECTS_DATA(lock, count))

Even if there are ten different "count" variables in the code, this still works because the compiler knows from context (where the annotation was placed in the source) which one is meant. Since commands are separate from the source, one must be more specific, using a syntax which does not correspond to anything in C to disambiguate. Instead of saying "count" one might have to say "file1.c:count" or even "file1.c:func3/count".

There are other non-obvious things about names when used with commands as well. In the above example the mutex has the name "lock", but that is a keyword in the grammar for the commands, so one would get a syntax error if she forgot to quote the word "lock" in the command. There is no such problem with NOTE annotations.

Assertions and NOTE annotations can be made at any point within a function. Wherever an assertion is placed, that's where the check occurs. With commands, the highest granularity that can be offered is to check an assertion on entry to a function. Specifying a location within a function is not feasible because any mention of line number, etc. would quickly become wrong as the code gets modified. For example, consider the code

```
func1( ) {
    ...
    assert(MUTEX_HELD(&mtx));
    ...
}
```

The equivalent command might be assert mtx protects func1 at line 247 but as soon as a line is inserted or deleted, such a command becomes wrong. Hence, there is nothing stable to point to other than the function name.

However, even the function name itself can change. If the name "func1" were changed to "func2", the command would fail (or worse, might work but do the wrong thing, if a different function is given the name func1), whereas the annotation would still work perfectly.

Similarly, the following NOTE benefits from this line-number resolution whereas its command counterpart has only function resolution:

NOTE(NOT_REACHED)

The following annotations allow the user to specify that in certain sections of code locking is unnecessary because no other threads are running (at least none that are relevant). They don't even have command equivalents; if they did, they would suffer from the resolution problem as well.

NOTE(COMPETING_THREADS_NOW)

NOTE(NO_COMPETING_THREADS_NOW)

The same is true for the following annotations, which allow one to specify that in a certain section of code certain variables cannot be accessed by other threads, and hence don't need to be protected by locks:

NOTE(NOW_INVISIBLE_TO_OTHER_THREADS(DataExpr, . . .))

NOTE(NOW_VISIBLE_TO_OTHER_THREADS(DataExpr, . .
.))

A header file might be used by dozens or even hundreds of different programs. Without NOTE annotations, the user would have to know that his/her application uses a particular header file (this is not always obvious) and then copy or include commands that relate to it, into the command file FOR EACH APPLICATION.

For efficiency's sake, Warlock II does not record any information about variables which are defined but never used. Even if a command file is prepared for each header file, using it would result in an error at each place that a command refers to a variable which was never actually used by the application.

The "Summarize code of interest to Warlock" module (144 in FIG. 5)

How this part is implemented depends greatly on the existing implementation of the compiler. Typically a compiler's grammar will specify actions to be taken when various language constructs are recognized. The most important of these, as far as "wlcc" is concerned, is the "expression". When an expression is seen by wlcc, a depth-first traversal is performed on the parse tree for the expression, and records are generated in the .ll file whenever variables are accessed, locks are acquired, and so on. Warlock II also takes note of statements such as "while", "for", "do", "switch", and "goto", recording the control flow as branch and label records in the .ll file.

In the preferred embodiment, the logic of this module is summarized as follows:

Handling an expression (for read, write, both, or no access):

```
If the expression is a function call
    For each argument to the function
        Recursively handle each argument expression as a read
If the name of the function is given
    If the function changes the state of a lock
        Generate the corresponding record in the .II file
    Else if the function tests an assertion
        Handle the assertion expression (see below)
    Else if the function operates on a condition variable
        Generate the corresponding record in the .II file
    Else if the function creates a thread
        Generate the corresponding record in the .II file
    Else
        Generate a "function call" record in the .II file
Else if the call is through a function pointer
    Generate a "pointer call" record in the .II file
Else if the expression is a comma expression
    Recursively handle the left and right subexpressions as reads
Else if the expression is a name
    Use the name to augment the current name being built
    If this doesn't represent a variable (e.g. it's an enum or func name)
        Set a flag causing this access to be ignored
    Record a use of the name for the current access mode (read/write/none)
Else if the expression is unary AND (to take an address)
    Recursively handle the subexpression as no access
Else if the expression is an assignment
    Recursively handle the right subexpression as a read
    Recursively handle the left subexpression as a write
    If the left subexpression is a function pointer
        Generate a record in the .II file associating the target
            function with the function pointer
Else if the expression is an increment or decrement (++ or --)
    Recursively handle the subexpression as both a read and write
Else if the expression is logical AND (&&) or OR (||):
    Recursively handle the left subexpression
    Generate flow control for short-circuit
    Recursively handle the right subexpression
etc.
```

Handle an assertion expression:

```
If the expression is logically the AND of two simpler expressions
    Recursively handle those simpler assertion expressions
Else if the expression tests the state of a lock
(e.g. IMUTEX_HELD(&mtx))
    Generate the corresponding record in the .II file
```

Those skilled in the art will recognize that equivalent logic can be used in whatever compiler system happens to be available to accommodate such data.

The ".ll" file

Referring now to FIG. 6, an exemplary annotated target program would look like the following:

```
/*
 * example.c - an example of how warlock works.
 *
 * The three included header files will ordinarily be found in /usr/include,
 * and the net effect will be to make the NOTE(. . .) and assert(. . .) vanish.
 * When compiling for warlock, though, we look in a special directory for
 * header files before looking in /usr/include. We will find special versions
 * there, which cause NOTE(. . .) and assert(. . .) to generate special stuff
 * understood by the augmented parser in warlock's version of the compiler.
 *
 * That version of the compiler uses this information to prepare a .ll file
 * which describes what the code does that is of interest to warlock.
 */
include <note.h>
include <assert.h>
include <synch.h>
mutex_t mtx;
NOTE(MUTEX_PROTECTS_DATA(mtx, count))
func1( ) {
        mutex_lock (&mtx);
        if (count = 100) {
            count = 0;
            return;         /* error: forgot to release lock */
        }
        func2 ( );
        mutex_unlock (&mtx);
        func2( );           /* error: func2 assumes mtx held */
        count++;            /* error: not holding mtx during access */
}
func2( ) {
        assert (MUTEX_HELD (&mtx));
}
```

Referring now to FIG. 6 the above program is shown as it would appear in its ".ll" file 600. The above program is shown 604 with the corresponding data records in the ".ll" file 606. The exemplary program 604 contains a NOTE 608 of the type "lock :mtx 610 protects variable 612 :count 614". These data correspond to entries in the ".ll" file record 606 as follows:

":mtx" 610 corresponds to record entry "Mutex Name" 630;

":count" 614 corresponds to record entry "Var Name" 632.

Similarly, the function name 616 corresponds to the triple record entries "Func Name, File Name and Func Defn" 636; "acquire mutex lock :mtx" 618 corresponds to "Acq Mtx" 638; "read from variable :count" 620 corresponds to "read" 640; etc. While this illustration of the format of the ".ll" file in the preferred embodiment is shown in exemplary form, those skilled in these arts will recognize that any equivalent and consistent format could be used for this ".ll" intermediate file.

The routine "handle_note(note_name, argument_list)" (see FIG. 5 block 142) was added to the revised compiler front end as a part of this invention, to summarize the Warlock II annotations contained in the annotated source code of the target program. This routine is called from the parser when a NOTE is encountered, and its operation is generally defined by the following pseudo-code:

```
if note_name is "NO_LOCKS_HELD"
    if argument_list is empty
        write record to .ll file saying "no locks held at line x"
    else
        complain about syntax
else if note_name is "MUTEX_PROTECTS_DATA"
    if first argument is name of some lock
        for each remaining argument
            if argument is name of some variable
                write record to .ll file saying "mutex x protects variable y"
            else
                complain about syntax
    else
        complain about syntax
else
    . . .
```

It will be recognized by those skilled in the art that any equivalent routine for summarizing the NOTE annotations data on lock usage will accomplish the desired result.

The wlanalyze program.

Figure 7:
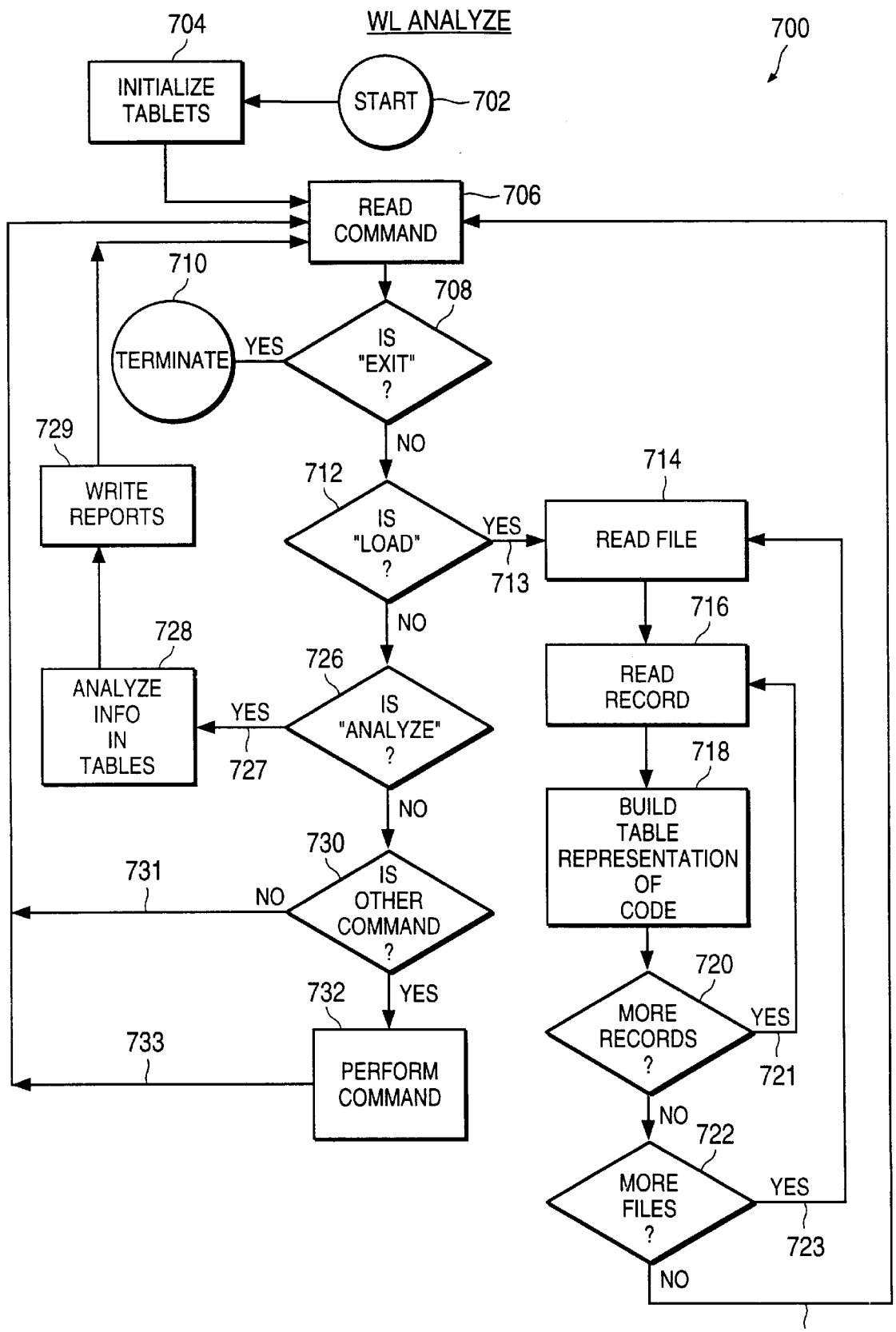
FIG. 7 illustrates a block diagram of the "wlanalyze" program.

The second major element of the Warlock II system is the "wlanalyze" program. Referring now to FIG. 7 the preferred embodiment of the "wlanalyze" program 700 is described. The user/developer loads wlanalyze by calling "wlanalyze". The program initializes its tables 704 and reads the first command 706. The developer then executes a load of the designated ".ll" files 713 by calling "load foo.ll bar.ll" for example. The wlanalyze program reads the .ll files indicated 714. The wlanalyze then builds a table representation of the code in the file being read 718 (these tables are described in more detail below). When all records of all files to be loaded have been processed 724, wlanalyze is ready to execute other commands. A complete list of the commands which may be executed and their description is contained in chapter 3 of the aforementioned "lock_lint User's Guide", Part # 801-6692-10 issued September 1994 by SunSoft, a Sun Microsystems, Inc. company, which is incorporated fully herein by reference. Normally, after loading the .ll files of interest, the User/Developer would soon execute the "analyze" command 726 which then proceeds to analyze the target program's code for it usage of locks 728 (this is described in more detail below). Similarly, the "wlanalyze" program will execute any other of the possible commands as indicated in the "lock_lint User's Guide", and on completion exit the program.

The result of the "analyze" operation is a report of potential problems found in the code 729. FIG. 8 displays a sample output report from the "analyze" step. The analysis performed in these steps by wlanalyze may produce messages saying that a lock was released when it was not held, that a covered lock was acquired while its cover was not held, or the like. If a program has been running successfully, these particular messages often don't reflect true problems in the code, but rather limitations in wlanalyze's ability to understand the code. Through the use of conditional compilation one can present to wlanalyze a somewhat simplified version of troublesome code fragments, allowing the wlanalyze to conduct a meaningful analysis.

Once the analysis completes without such errors, the user asks to see which variables are not consistently protected by locks. The user may make assertions to wlanalyze about which variables are supposed to be protected by a lock and about which locks are supposed to be held whenever a function is called. Running the analysis with such assertions in place will show the user where the assertions are violated. Again, these violations may represent limitations in wlanalyze's ability to understand the code or they may represent actual problems in the code.

How wlanalyze works

1) Major Data Structures.

In the program step wherein wlanalyze builds table representations ( block 718 in FIG. 7) of the annotated code from the target program, the following data tables are built:

table of functions;

table of locks;

table of variables;

table of function pointers; and an adjacency matrix for lock ordering.

In the preferred embodiment the following key information is maintained in these files:

table of functions; for each function maintain:
- a list of "basic blocks", where a "basic block" is a sequence of consecutive statements in which flow of control enters at the beginning of the block and leaves at the end without halt or the possibility of branching except at the end, and a "flow graph", which is a directed graph the nodes of which are the "basic blocks" of the target program, connected in the sequences in which they may be executed.
- a list of side effects on locks (for example, func acquires mutex X without releasing it).

table of variables; for each variable maintain:
- a list of locks consistently held every time the variable was accessed; and
- a lock declared by annotation to protect the variable (if any).

table of locks; for each lock maintain:
- lock type (readers/writer lock or mutex);
- current lock state (held, read-held, released); and
- some history of activity on the lock (for reporting of errors).

table of function pointers, for each pointer maintain:
- a list of functions which can be reached by a call through the function pointer.

adjacency matrix for lock ordering;
- a well known method for representing graphs in a computer program is by use of an "adjacency matrix". (See for example pages 376–381 of "Algorithms" by Robert Sedgewick, Addison-Wesley, 1983, ISBN 0-201-06672-6). The adjacency matrix is used to detect deadlocks as follows:

An adjacency matrix is used to record orderings between locks during the course of simulating the execution of the target program (this is described in more detail below). That is, if the target program acquires lock b while holding locks a and c, then the following orderings are recorded:

a,b c,b

That is, "a before b" and "c before b". The adjacency matrix is a two dimensional array with a row and a column for each lock. The rows represent the first lock and the columns the second lock in the orderings. For example, in the above situation, if there are four locks the adjacency matrix would be

|   | a | b | c | d |
|---|---|---|---|---|
| a | . | # | . | . |
| b | . | . | . | . |
| c | . | # | . | . |
| d | . | . | . | . |

Here "." is used to represent an unseen ordering, and "#" a seen ordering.

Orderings are captured in this way during the simulation of all paths through the program. Then a transitive closure is performed on the orderings. (Transitive closure is described in the above mentioned book on "Algorithms" at pages 423–430 including a simple nonrecursive program for computing the transitive closure of a graph represented by an adjacency matrix). The meaning of "a transitive closure is performed on the orderings" is simple to see by example. Consider that after the target program has been completely simulated, we have the following adjacency matrix:

|   | a | b | c | d |
|---|---|---|---|---|
| a | . | # | . | . |
| b | . | . | . | # |
| c | . | # | . | . |
| d | # | . | . | . |

That is, the following orderings were seen:

a,b b,d c,b d,a

Transitive closure means that if for any three locks u, v, and w, u,v and v,w then we also add to the matrix the ordering u,w That is, if u is before v in the locking order, and v is before w, then u must be before w. Applying transitive closure to the example gives the following adjacency matrix:

|   | a | b | c | d |
|---|---|---|---|---|
| a | # | # | . | # |
| b | # | # | . | # |
| c | # | # | . | # |
| d | # | # | . | # |

That is, we've added the following orderings a,b+b,d→a,d
c,b+b,d→c,d
a,d+d,a→a,a
b,d+d,a→b,a
c,b+b,a→c,a
b,a+a,b→b,b
d,a+a,b→d,b
d,a+a,d→d,d The matrix is now telling us that a comes before b, and also that b comes before a in the locking order used within the program. This means that the program can deadlock and this condition would be reported to the User/Developer.

2) How the Analyze Operation Works.

In the preferred embodiment, when the "analyze" command is executed (leg 727 and block 728 in FIG. 7), wlanalyze performs the following:

The control flow within each function is analyzed. That is, a list of "basic blocks" to process in order when simulating the function, is generated. The analyze program keeps track of the side effects on locks for each path through the function, making sure they match those which may have been declared by annotations (if any). The program notes whether the function "returns". During this analysis, if a function calls another function, the program will perform the same analysis on the called function in order to determine its side effects on locks. If the analyze encounters a recursion (i.e. finds itself calling a function that it is already in the process of simulating), it allows a second invocation of the function but not a third. The recursion is assumed NOT to have side effects on locks. Those skilled in the art will understand that any reasonable number of passes through such a loop may be performed depending on the circumstances the person might want to evaluate, while weighing the value of the additional passes against the additional operating time required to do so. A check is made for function pointers which target functions with differing side effects on locks.

In the preferred embodiment, the "analyze" routine then simulates the execution of the target program code. This is done by using the flow information generated in the previous step, and following the movement of the target program through the basic blocks. For each basic block, the activity for that block is simulated. For each part of that activity, the following actions are taken;

If a lock's state is changed (e.g. the lock is acquired or released), check to see whether the change is legal given the current state of the lock. For example, releasing a lock which is not held is an error. When a lock is acquired, if other locks are already held, record the orderings in the adjacency matrix and check to make sure the order does not violate those specified in annotations. Check to make sure that if a covering lock has been defined for the lock, the covering lock is always held whenever the covered lock is held.

check any "assertions" ( for example, if it was asserted that "mutex x is held" at this point, check the state of lock X to see if it is "held");

if a variable is accessed, and an annotation specified which lock protects that variable, check to see if that lock is "held". If the variable was designated read-only, check to see that it is not being written. In any case, update the list of locks consistently held when that variable is accessed;

for a function call, recursively simulate the called function, noting the state of any locks involved as indicated above.

Upon completion, a report is issued of variables not consistently protected by any locks. The "transitive closure" process if performed on the adjacency matrix and any indicated deadlocks are reported by looking for cycles. Those skilled in the art will recognize that any number of additional tests and checks may be performed at the time the flow of the target program is simulated, all of which must by selected by weighing the additional test value against the additional testing time required. Some tests not performed in the preferred embodiment, but which could easily be added are:

Warlock II currently recognizes functions which have the property of dropping and reacquiring a lock which is held by the caller. Since calling such a function introduces arisk, it would be a natural extension to warn the user of the risk unless a NOTE is present announcing the danger, such as for example:

```
NOTE(CALL_BREAKS_LOCK(func1, &mutex1))
if (func1( ) == -1)
  . . .
```

An alternate annotation could be made available for those cases where somehow it is known that the risk is not real such as, for example:

```
NOTE(CALL_DOES_NOT_BREAK_LOCK(func1, &mutex1)).
```

Some Caveats.

In the preferred embodiment the program wlanalyze, like most static analyzers, cannot distinguish between different instances of a data type accessed through pointers and/or array indexing. For structures, wlanalyze employs the usual solution of treating all such instances of the structure as a single instance. In its reporting, wlanalyze refers to member "mbr" of an anonymous instance of the structure with tag "tag" as "tag::mbr". This notation is borrowed from the C++ language.

Unfortunately, the C language allows a structure to be defined without assigning it a tag. In this event the compiler generally makes up a tag name for the structure. The program wlanalyze could not use the name fabricated by the particular compiler upon which wlanalyze was based, since the name assigned would not in general be consistent across programs sharing the definition of that structure. Therefore wlanalyze assigns its own name for the tag, creating it from the file name and line number in which the structure was defined. For example, the tag name created for a tagless structure defined on line 10 of file "x.c" would be "x.c@ 10". Clearly this approach works for structures defined in include files but fails if the definition is simply copied into multiple files.

Anonymous simple types are ignored by wlanalyze. In the following example, the wlcc compiler makes a record of the access to foo::a, but not for the access to *ip:

```
struct foo {
    int a;
};
bar(struct foo* foop, int* ip)
{
    foop—>a = 2;
    *ip = 3;
}
```

The write to *ip is every bit as subject to data races as the write to foop→a, so it would be helpful to have wlanalyze check whether accesses to it are consistently protected. However, while all "foo::a" are protected by a single lock (or at least, wlanalyze assumes so), it is unlikely that all anonymous "ints" are protected by a single lock. Therefore if wlanalyze were to include such accesses in its analysis, it would almost certainly report them as errors.

Scope of identifier

The C language, like many block-structured languages, allows a variable to become hidden by the introduction of another variable by the same name in a more immediate scope. Within the program, the scope rules determine which variable by that name will actually be accessed, and the others are simply inaccessible. By embedding directives in source in the form of NOTE invocations and then parsing the directives along with actual program code, scope rules can be applied to names within directives.

Data dependencies

Currently wlanalyze makes no attempt whatsoever to keep track of the values of variables. This can cause the program to analyze paths through the target code which could not really be taken. In the following code fragment, for example, if the lock is acquired, then it is released, and if it is not acquired, then it is not released.

```
Bool we_locked_it = FALSE;
if (...) {
    mutex_lock (&lock);
    we_locked_it = TRUE;
}
...
if (we_locked_it)
    mutext_unlock (&lock);
```

But because wlanalyze does not keep track of the value of variable we_locked_it, wlanalyze sees four possible paths through this code rather than two. In one of those paths the program unlocks the lock without having locked it—clearly an error—and in the other the program leaves the lock locked, causing the function to appear to have inconsistent side-effects on the locks. When warlock encounters inconsistent side effects like this, it warns the user and eliminates from its analysis all control paths through the function which lead to incorrect side effects.

A Review of the Use of the Warlock II System

Figure 9:
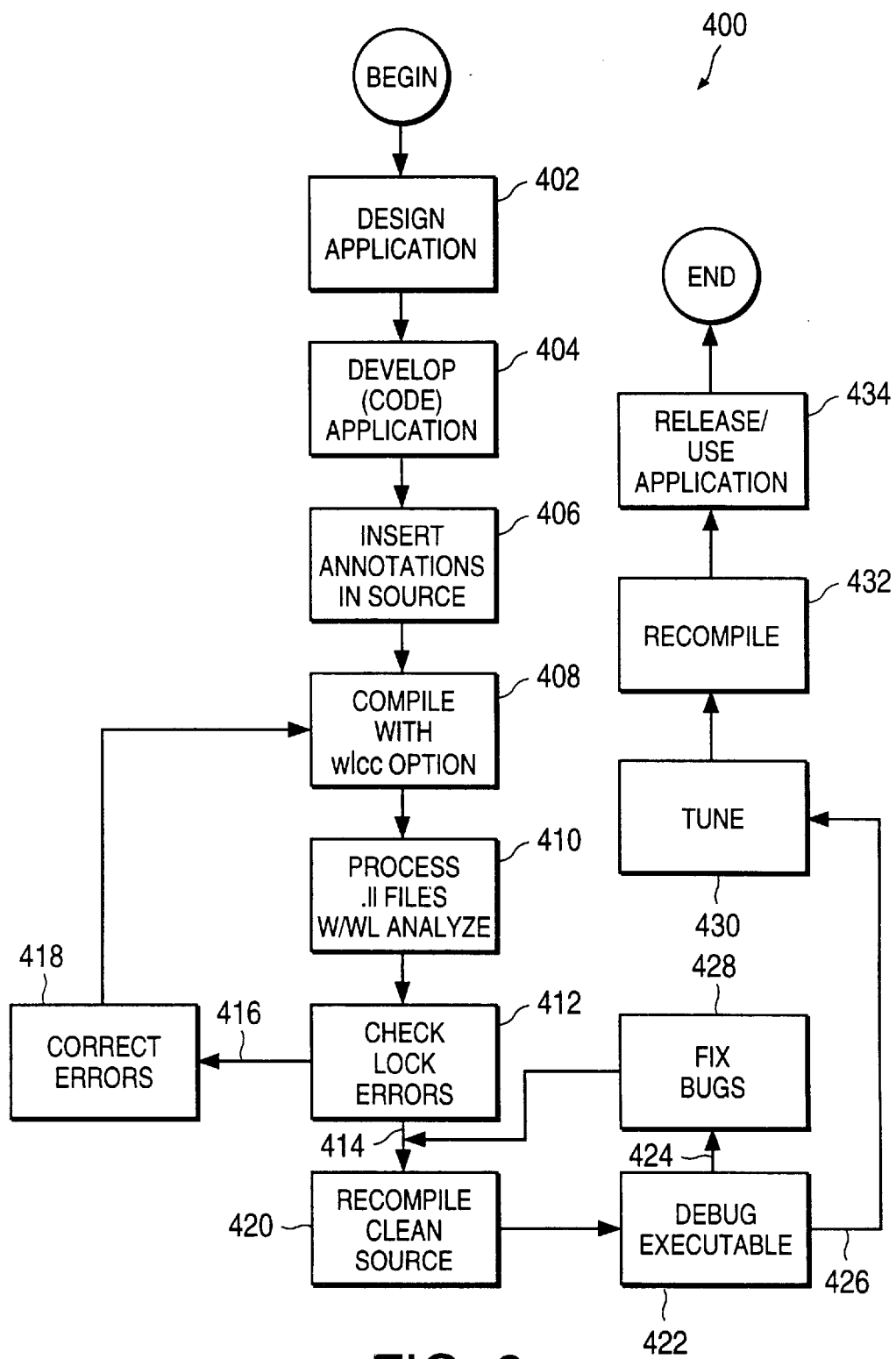
FIG. 9 illustrates a block diagram of the general use of the Warlock II system by a user.

Referring now to FIG. 9, a flow diagram of the entire process of using the Warlock II system 400 is depicted. To begin a developer designs an application 402, codes the application 404 and inserts annotations in the form of NOTE invocations into the source code 406. The developer then compiles the annotated source code 408 specifying "wlcc" which produces a ".ll" file. Then the developer processes this ".ll" file and any related ".ll" files using the "wlanalyze" program 410 which reports any lock use errors 412. The developer corrects any errors 418 that may exist, recompiles the corrected source code 408 and loops through the process 410, 412 again until there are no found lock errors 414. The developer now recompiles the clean source 420 without the "wlcc" option to create a normal executable file (".o") which can be debugged for logic errors 422 using the appropriate debug tool. When the code is bug free 426 the developer can then "tune" the code to increase efficiency, etc. 430 and after a final recompile 432 is ready to use or release the application 434.

It will be appreciated by those skilled in the art that various modifications and alterations may be made in the preferred embodiments of the invention disclosed herein without departing from the scope of this invention. Accordingly, the scope of the invention is not to be limited to the particular invention embodiments discussed above, but should be defined only by the claims set forth below and equivalents thereof.

Page: 53

APPENDIX A yacc grammar

Changes to yacc grammar for handling annotations.

While the following is an example of the type of changes required to produce a modified compiler similar to that described in the disclosure those skilled in the art will recognize that although much of this can probably be used as is, one will have to fit this into their own C grammar appropriately. It should be clear from this doctored excerpt from Warlock II how that can be done.

```
/* L_NOTE is simply the text "__annotation". */
%token  L_NOTE

%%

/*
 * A "note" is an annotation originally of the form
 *           NOTE(NoteName(Arguments))
 * or simply
 *           NOTE(NoteName)
 * If the NoteName is one we were expecting, macro expansions have
 * changed it to
 *           __annotation("NoteName", NoteArgs)
 * where NoteArgs is the Arguments encoded as a single C expression
 * (e.g. a comma expression of many args, or a string if the stuff
```

Page: 54

```
* inside is not C-like).
*
* At this point if one sees an identifier instead of "NoteName" it is known it was an unrecognized
macro. Later one checks that unrecognized NoteName against a list of NoteNames recognized by
other tools.
*
The following captures NoteName and NoteArgs to be accessed by handle_note(). If the NoteName
isn't recognized, one sets note_name to NULL and captures the unrecognized name in
bad_note_name./
note:
                L_NOTE L_LP L_STRING   { note_name = $3->string; }
                note_args L_RP
        |   L_NOTE L_LP L_IDENT L_LP error L_RP L_RP
                { note_name = NULL;
                  bad_note_name = $3.name;
                }
            ;

note_args:
                /*EMPTY*/        { note_args = NULL; }
        |    L_COMMA argument_expression_list
                        { note_args = $2; }
            ;

/*
 * Now that what a NOTE looks like has been defined, it is hooked
```

Page: 55

```
 1    * into the existing grammar. One also wants to record whether the NOTE was
      * inside a function definition. The nonterminal "external_definition"
      * handles the cases where it is not. Nonterminal "func_notes"
      * represents an arbitrary number of NOTEs in sequence, somewhere
 5    * within a function. The use of func_notes in the remaining nonterminals
      * represents places in the grammar for a function definition where a note
      * could legally be placed. Since the nonterminals in one's grammar won't
      * precisely match applicant's, one will have to find the corresponding places in
      * their grammar.
10    *
      * Note that the ultimate effect of finding a NOTE in any of these places
      * is to call handle_note() with the following globals set:
      *          char* note_name
      *          expression_type note_args
15    *          boolean note_in_function
      *          char* bad_note_name (if note_name == NULL, this is the bad note)
      */ external_definition:  /* NOTE not in a function definition */
20                  note              { note_in_function = FALSE;
                                        handle_note();
                                      }
                    ;

25    func_notes:  /* NOTE in a function definition */
                   /*EMPTY*/
```

P696 -WARLOCK II                                        5/22/95-ejb

Page: 56

```
           func_notes note      { note_in_function = TRUE;
                                  handle_note();
                                }
        ;

labeled_statement:
           id_or_type L_COLON func_notes statement
        |  L_CASE constant_expression L_COLON func_notes statement
        |  L_DEFAULT L_COLON func_notes statement
        ;

compound_statement:
           cmpdL_LC notes_declaration_list statement_list func_notes cmpdL_RC
        |  cmpdL_LC statement_list func_notes cmpdL_RC
        |  cmpdL_LC notes_declaration_list func_notes cmpdL_RC
        |  cmpdL_LC func_notes cmpdL_RC
        ;

notes_declaration_list:
           func_notes declaration
        |  notes_declaration_list func_notes declaration
        ;

statement_list:
``` func_notes statement
| statement_list func_notes statement
;

Page: 58

APPENDIX B

```
****************************************
*   AN EXAMPLE OF HOW WARLOCK WORKS   *
****************************************

/*
 * example.c - an example of how warlock works.
 *
 * The three included header files will ordinarily be found in /usr/include,
 * and the net effect will be to make the NOTE(...) and assert(...) vanish.
 * When compiling for warlock, though, we look in a special directory for
 * header files before looking in /usr/include.  We will find special versions
 * there, which cause NOTE(...) and assert(...) to generate special stuff
 * understood by the augmented parser in warlock's version of the compiler.
 *
 * That version of the compiler uses this information to prepare a .ll file
 * that describes what the code does that is of interest to warlock.
 */ include <note.h>
include <assert.h>
include <synch.h> mutex_t mtx;
int count;

NOTE(MUTEX_PROTECTS_DATA(mtx, count))

func1() {
        mutex_lock(&mtx);
        if (count == 100) {
                count = 0;
                return;         /* error: forgot to release lock */
        }
        func2();
        mutex_unlock(&mtx);

func2();                /* error: func2 assumes mtx held */
        count++;                /* error: not holding mtx during access */
} func2() {
        assert(MUTEX_HELD(&mtx));
}
```

P696 -WARLOCK II

5/12/95-ejb

Page: 59
APPENDIX C

Annotations

Warlock statically checks assert(Assertion);

where Assertion is any of the following:

MUTEX_HELD( MutexExpr)

RW_LOCK_HELD(RwlockExpr)

RW_READ_HELD(RwlockExpr)

RW_WRITE_HELD(RwlockExpr)

mutex_owned( MutexExpr)

rw_lock_held(RwlockExpr)

rw_read_held(RwlockExpr)

rw_write_held(RwlockExpr)

rw_read_locked(RwlockExpr)

NO_LOCKS_HELD

NO_COMPETING_THREADS

Warlock understands

NOTE(Note)

where Note is any of the following:

MUTEX_PROTECTS_DATA(Mutex, DataList)

RWLOCK_PROTECTS_DATA(Rwlock, DataList)

SCHEME_PROTECTS_DATA("Scheme", DataList)

READ_ONLY_DATA(DataList)

DATA_READABLE_WITHOUT_LOCK(DataList)

RWLOCK_COVERS_LOCKS(Rwlock, LockList)

LOCK_ORDER(LockList)

P696 -WARLOCK II      5/22/95-ejb

The Note can also be any of the following if located inside a function body:

COMPETING_THREADS_NOW
NO_COMPETING_THREADS_NOW
NOT_REACHED
MUTEX_ACQUIRED_AS_SIDE_EFFECT(MutexExpr)
READ_LOCK_ACQUIRED_AS_SIDE_EFFECT(RwlockExpr)
WRITE_LOCK_ACQUIRED_AS_SIDE_EFFECT(RwlockExpr)
LOCK_RELEASED_AS_SIDE_EFFECT(LockExpr)
LOCK_UPGRADED_AS_SIDE_EFFECT(RwlockExpr)
LOCK_DOWNGRADED_AS_SIDE_EFFECT(RwlockExpr)
COMPETING_THREADS_AS_SIDE_EFFECT
NO_COMPETING_THREADS_AS_SIDE_EFFECT
NOW_INVISIBLE_TO_OTHER_THREADS(DataExpr [, DataExpr ...])
NOW_VISIBLE_TO_OTHER_THREADS(DataExpr [, DataExpr ...])
ASSUMING_PROTECTED(DataExpr [, DataExpr ...])

Mutex and Rwlock represent the name of a lock. LockList and DataList represent whitespace-separated lists of names of locks or variables. Scheme is just a description -- any text.

MutexExpr signifies any valid C expression representing the address of a mutex. RwlockExpr is the address of a readers/writer lock, and LockExpr is the address of a lock of either type. DataExpr signifies any valid C expression respresenting a set of variables (not their addresses).

What is claimed is:

1. A method for locating errors in the use of synchronization locks in a multi-threaded target program, through the use of a computer having a central processor unit, a memory, an input and an output device and a display device, said method comprising the steps of:

providing a modified ANSI C compiler which is configured to process annotated source code for said target program and to produce an intermediate output file containing coded representations of the source code and coded representations of annotations, wherein the annotations are in the form of a NOTE macro command;

providing an analyzer program configured to receive said intermediate output file and to analyze uses of synchronization locks by said source code in said intermediate file and to compare said uses of synchronization locks with lock uses specified in said annotations; and under computer control using said modified ANSI C compiler to process annotated source code for said target program, and said analyzer program to check usage of synchronization locks as specified by said source code as compared to uses of said synchronization locks as specified by said annotations and display at least a subset of inconsistencies in said usage of said synchronization locks as detected by said analyzer program.

2. A method for locating errors in the use of synchronization locks in a multi-threaded target program, through the use of a computer having a central processor unit, a memory, an input and an output device and a display device, said method comprising the steps of:

providing a modified ANSI C compiler which is configured to process annotated source code for said target program and to produce an intermediate output file containing coded representations of the source code and coded representations of annotations;

providing within said modified ANSI C compiler a modified analysis module configured to process annotations which are coded as extensions to C language code;

providing within said modified ANSI C compiler a module configured to summarize said annotations which are coded as extensions to C language code;

providing an analyzer program configured to receive said intermediate output file and to analyze uses of synchronization locks by said source code in said intermediate file and to compare said uses of synchronization locks with lock uses specified in said annotations; and under computer control using said modified ANSI C compiler to process annotated source code for said target program, and said analyzer program to check usage of synchronization locks as specified by said source code as compared to uses of said synchronization locks as specified by said annotations and display at least a subset of inconsistencies in said usage of said synchronization locks as detected by said analyzer program.

3. The method of claim 1 wherein the step of providing an analyzer program comprises the additional step of providing within said analyzer program a set of data structures configured to contain representations of said annotated source code.

4. The method of claim 3 wherein the set of data structures configured to contain representations of said annotated source code comprises a table of functions which contains for each of said functions at least a list of basic blocks for said each function and a list of side effects for locks used by said each function.

5. The method of claim 3 wherein the set of data structures configured to contain representations of said annotated source code comprises a table of function pointers which contains for each pointer at least a list of functions which can be reached by a call through said each pointer.

6. A method for locating errors in the use of synchronization locks in a multi-threaded target program, through the use of a computer having a central processor unit, a memory, an input and an output device and a display device, said method comprising the steps of:

providing a modified ANSI C compiler which is configured to process annotated source code for said target program and to produce an intermediate output file containing coded representations of the source code and coded representations of annotations;

providing an analyzer program configured to receive said intermediate output file and to analyze uses of synchronization locks by said source code in said intermediate file and to compare said uses of synchronization locks with lock uses specified in said annotations wherein the step of providing an analyzer program comprises the additional step of providing within said analyzer program a set of data structures configured to contain representations of said annotated source code and wherein the set of data structures configured to contain representations of said annotated source code comprises a table of locks which contains for each lock at least a lock type, a current lock state, and a history of activity on said each lock; and under computer control using said modified ANSI C compiler to process annotated source code for said target program, and said analyzer program to check usage of synchronization locks as specified by said source code as compared to uses of said synchronization locks as specified by said annotations and display at least a subset of inconsistencies in said usage of said synchronization locks as detected by said analyzer program.

7. A method for locating errors in the use of synchronization locks in a multi-threaded target program, through the use of a computer having a central processor unit, a memory, an input and an output device and a display device, said method comprising the steps of:

providing a modified ANSI C compiler which is configured to process annotated source code for said target program and to produce an intermediate output file containing coded representations of the source code and coded representations of annotations;

providing an analyzer program configured to receive said intermediate output file and to analyze uses of synchronization locks by said source code in said intermediate file and to compare said uses of synchronization locks with lock uses specified in said annotations wherein the step of providing an analyzer program comprises the additional step of providing within said analyzer program a set of data structures configured to contain representations of said annotated source code and wherein the set of data structures configured to contain representations of said annotated source code comprises a table of variables which contains for each variable at least a list of locks consistently held every time said each variable was accessed and an identification of a lock declared by annotation to protect said each variable, if said identification has been specified; and under computer control using said modified ANSI C compiler to process annotated source code for said target program, and said analyzer program to check usage of synchronization locks as specified by said source code as compared to uses of said synchronization locks as specified by said annotations and display at least a subset of inconsistencies in said usage of said synchronization locks as detected by said analyzer program.

8. A method for locating errors in the use of synchronization locks in a multi-threaded target program, through the use of a computer having a central processor unit, a memos, an input and an output device and a display device, said method comprising the steps of:

providing a modified ANSI C compiler which is configured to process annotated source code for said target program and to produce an intermediate output file containing coded representations of the source code and coded representations of annotations;

providing an analyzer program configured to receive said intermediate output file and to analyze uses of synchronization locks by said source code in said intermediate file and to compare said uses of synchronization locks with lock uses specified in said annotations wherein the step of providing an analyzer program comprises the additional step of providing within said analyzer program a set of data structures configured to contain representations of said annotated source code and wherein the set of data structures configured to contain representations of said annotated source code comprises an adjacency matrix configured to record orderings between locks during a simulation of an execution of said target program and where a transitive closure can be performed on said orderings between locks to provide an indication of any deadlocks which may occur in said target program; and under computer control using said modified ANSI C compiler to process annotated source code for said target program, and said analyzer program to check usage of synchronization locks as specified by said source code as compared to uses of said synchronization locks as specified by said annotations and display at least a subset of inconsistencies in said usage of said synchronization locks as detected by said analyzer program.

9. The method of claim 1 wherein the step of providing an analyzer program comprises the additional step of providing within said analyzer program a flow information generator configured to create at least a list of basic blocks which represents control flow within each function, and to keep track of side effects on locks for each path through said function.

10. The method of claim 9 wherein the analyzer program is further configured to simulate execution of the target program by using said list of basic blocks which represents control flow within each function and to record data about locks used by said target program.

11. A modified ANSI C compiler for locating errors in the use of synchronization locks in a multi-threaded target program, through the use of a computer having a central processor unit, a memory, an input and an output device and a display device comprising:

a modified analysis module configured to process annotated source code for said target program and to create annotations which are coded as extensions to C language code;

a module configured to summarize said annotations which are coded as extensions to C language code, said summary for use in analyzing lock usage by said target program; and an output mechanism configured to produce an intermediate output file containing coded representations of the source code and coded representations of said annotations.

12. An analyzer system for locating errors in the use of synchronization locks in a multi-threaded target program, through the use of a computer having a central processor unit, a memory, an input and an output device and a display device, said analyzer system comprising a first analysis mechanism configured to process a file containing coded representations of source code and coded representations of annotations for said target program and to produce at least a set of data structures configured to contain representations of said annotated source code, wherein the annotations are in the form of a NOTE macro command, and a flow information generator configured to create at least a list of basic blocks which represents control flow within each function.

13. The analyzer system of claim 12 wherein the set of data structures configured to contain representations of said annotated source code comprises a table of functions which contains for each of said functions at least a list of basic blocks for said each function and a list of side effects for locks used by said each function.

14. The analyzer system of claim 12 wherein the set of data structures configured to contain representations of said annotated source code comprises a table of locks which contains for each lock at least a lock type, a current lock state, and a history of activity on said each lock.

15. The analyzer system of claim 12 wherein the set of data structures configured to contain representations of said annotated source code comprises a table of variables which contains for each variable at least a list of locks consistently held every time said each variable was accessed and an identification of a lock declared by annotation to protect said each variable, if said identification has been specified.

16. The analyzer system of claim 12 which further comprises a second analysis mechanism configured to simulate execution of the target program by using said list of basic blocks which represents control flow within each function and to record data about locks used by said target program.

17. A computer program product comprising:

a computer usable medium having computer readable program code mechanisms embodied therein configured to locate errors in the use of synchronization locks in a multi-threaded target program, the computer readable program code mechanisms in said computer program product comprising:

computer readable code mechanisms configured to cause a computer to process annotated source code for said target program and to produce an intermediate output file containing coded representations of the source code and coded representations of annotoations, wherein the annotations are in the form of a NOTE macro command;

computer readable code mechanisms configured to cause the computer to process said intermediate output file and to analyze uses of synchronization locks by said source code in said intermediate output file and to compare said uses of synchronazation locks with lock uses specified in said annotaitons; and computer readable code mechanisms configured to cause the computer to display at least a subset of inconsistencies in said usage of said synchronization locks as detected by said analysis.

18. A computer program product comprising:

a computer usable medium having computer readable program code mechanisms embodied therein configured to locate errors in the use of synchronization locks in a multi-threaded target program, the computer readable program code mechanisms in said computer program product comprising:

computer readable code mechanisms configured to cause a computer to process annotated source code for said target program and to create annotations which are coded as extensions to C language code;

computer readable code mechanisms configured to cause the computer to summarize said annotations which are coded as extensions to C language code, said summary for use in analyzing lock usage by said target program; and computer readable code mechanisms configured to cause the computer to produce an intermediate output file containing coded representations of the source code and coded representations of said annotations.

19. A computer program product comprising:

a computer usable medium having computer readable program code mechanisms embodied therein configured to locate errors in the use of synchronization locks in a multi-threaded target program, the computer readable program code mechanisms in said computer program product comprising:

computer readable code mechanisms configured to cause a computer to process a file containing coded representations of source code and coded representations of annotations for said target program and to produce at least a set of data structures configured to contain representations of said annotated source code, wherein the annotations are in the form of a NOTE macro command, and computer readable code mechanisms configured to produce a flow information generator configured to create at least a list of basic blocks which represents control flow within each function.

20. The computer program product of claim 19 wherein said set of data structures configured to contain representations of said annotated source code comprises a table of functions which contains for each of said functions at least a list of basic blocks for said each function and a list of side effects for locks used by said each function.

21. The computer program product of claim 19 wherein said set of data structures configured to contain representations of said annotated source code comprises a table of locks which contains for each lock at least a lock type, a current lock state, and a history of activity on said each lock.

22. The computer program product of claim 19 wherein said set of data structures configured to contain representations of said annotated source code comprises a table of variables which contains for each variable at least a list of locks consistently held every time said each variable was accessed and an identification of a lock declared by annotation to protect said each variable, if said identification has been specified.

23. The computer program product of claim 19 wherein the set of data structures configured to contain representations of said annotated source code comprises a table of function pointers which contains for each pointer at least a list of functions which can be reached by a call through said each pointer.

24. The computer program product of claim 19 wherein the set of data structures configured to contain representations of said annotated source code comprises an adjacency matrix configured to record orderings between locks during a simulation of an execution of said target program and where a transitive closure can be performed on said orderings between locks to provide an indication of any deadlocks which may occur in said target program.

25. The computer program product of claim 19 which further comprises a flow information generator configured to create at least a list of basic blocks which represents control flow within each function, and to keep track of side effects on locks for each path through said function.

26. The computer program product of claim 25 which further comprises a second analysis mechanism configured to simulate execution of the target program by using said list of basic blocks which represents control flow within each function and to record data about locks used by said target program.

27. An apparatus for locating errors in the use of synchronization locks in a multi-threaded target program, through the use of a computer having a central processor unit, a memory, an input and an output device and a display device, said apparatus comprising:

a modified ANSI C compiler which is configured to process annotated source code for said target program and to produce an intermediate output file containing coded representations of the source code and coded representations of annotations, wherein the annotations are in the form of a NOTE macro command;

an analyzer device configured to receive said intermediate output file and to analyze uses of synchronization locks by said source code in said intermediate file and to compare said uses of synchronization locks with lock uses specified in said annotations; and a display mechanism coupled to said analyzer device and configured to display at least a subset of inconsistencies in said usage of said synchronization locks as detected by said analyzer device.

28. An apparatus for locating errors in the use of synchronization locks in a multi-threaded target program, through the use of a computer having a central processor unit, a memory, an input and an output device and a display device, said apparatus comprising:

a modified ANSI C compiler which is configured to process annotated source code for said target program and to produce an intermediate output file containing coded representations of the source code and coded representations of annotations wherein the modified ANSI C compiler comprises:

a modified grammar module configured to process annotations which are coded as extensions to C language code; and a collection module configured to summarize said annotations which are coded as extensions to C language code, and an analyzer device configured to receive said intermediate output file and to analyze uses of synchronization locks by said source code in said intermediate file and to compare said uses of synchronization locks with lock uses specified in said annotations; and a display mechanism coupled to said analyzer device and configured to display at least a subset of inconsistencies in said usage of said synchronization locks as detected by said analyzer device.

29. The apparatus of claim 27 wherein the analyzer device comprises a set of data structures configured to contain representations of said annotated source code.

30. The apparatus of claim 29 wherein the set of data structures configured to contain representations of said annotated source code comprises a table of functions which contains for each of said functions at least a list of basic blocks for said each function and a list of side effects for locks used by said each function.

31. The apparatus of claim 29 wherein the set of data structures configured to contain representations of said annotated source code comprises a table of function pointers which contains for each pointer at least a list of functions which can be reached by a call through said each pointer.

32. The apparatus of claim 29 wherein the step of providing an analyzer device comprises the additional step of providing within said analyzer device a flow information generator configured to create at least a list of basic blocks which represents control flow within each function, and to keep track of side effects on locks for each path through said function.

33. The apparatus of claim 32 wherein the analyzer device is further configured to simulate execution of the target program by using said list of basic blocks which represents control flow within each function and to record data about locks used by said target program.

34. An apparatus for locating errors in the use of synchronization locks in a multi-threaded target program, through the use of a computer having a central processor unit, a memory, an input and an output device and a display device, said apparatus comprising:

a modified ANSI C compiler which is configured to process annotated source code for said target program and to produce an intermediate output file containing coded representations of the source code and coded representations of annotations;

an analyzer device configured to receive said intermediate output file and to analyze uses of synchronization locks by said source code in said intermediate file and to compare said uses of synchronization locks with lock uses specified in said annotations wherein the analyzer device comprises a set of data structures configured to contain representations of said annotated source code wherein the set of data structures configured to contain representations of said annotated source code comprises a table of locks which contains for each lock at least a lock type, a current lock state, and a history of activity on said each lock; and a display mechanism coupled to said analyzer device and configured to display at least a subset of inconsistencies in said usage of said synchronization locks as detected by said analyzer device.

35. An apparatus for locating errors in the use of synchronization locks in a multi-threaded target program, through the use of a computer having a central processor unit, a memory, an input and an output device and a display device, said apparatus comprising:

a modified ANSI C compiler which is configured to process annotated source code for said target program and to produce an intermediate output file containing coded representations of the source code and coded representations of annotations;

an analyzer device configured to receive said intermediate output file and to analyze uses of synchronization locks by said source code in said intermediate file and to compare said uses of synchronization locks with lock uses specified in said annotations wherein the analyzer device comprises a set of data structures configured to contain representations of said annotated source code wherein the set of data structures configured to contain representations of said annotated source code comprises a table of variables which contains for each variable at least a list of locks consistently held every time said each variable was accessed and an identification of a lock declared by annotation to protect said each variable, if said identification has been specified; and a display mechanism coupled to said analyzer device and configured to display at least a subset of inconsistencies in said usage of said synchronization locks as detected by said analyzer device.

36. An apparatus for locating errors in the use of synchronization locks in a multi-threaded target program, through the use of a computer having a central processor unit, a memory, an input and an output device and a display device, said apparatus comprising:

a modified ANSI C compiler which is configured to process annotated source code for said target program and to produce an intermediate output file containing coded representations of the source code and coded representations of annotations;

an analyzer device configured to receive said intermediate output file and to analyze uses of synchronization locks by said source code in said intermediate file and to compare said uses of synchronization locks with lock uses specified in said annotations wherein the analyzer device comprises a set of data structures configured to contain representations of said annotated source code wherein the set of data structures configured to contain representations of said annotated source code comprises an adjacency matrix configured to record orderings between locks during a simulation of an execution of said target program and where a transitive closure can be performed on said orderings between locks to provide an indication of any deadlocks which may occur in said target program; and a display mechanism coupled to said analyzer device and configured to display at least a subset of inconsistencies in said usage of said synchronization locks as detected by said analyzer device.

* * * * *